United States Patent
Retana et al.

(10) Patent No.: US 7,609,672 B2
(45) Date of Patent: Oct. 27, 2009

(54) METHOD AND APPARATUS FOR AUTOMATIC SUB-DIVISION OF AREAS THAT FLOOD ROUTING INFORMATION

(75) Inventors: Alvaro Retana, Raleigh, NC (US); Russell White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 416 days.

(21) Appl. No.: 11/513,099

(22) Filed: Aug. 29, 2006

(65) Prior Publication Data

US 2008/0056157 A1    Mar. 6, 2008

(51) Int. Cl.
*H04W 4/00* (2009.01)
(52) U.S. Cl. .................. 370/328; 370/254; 709/242
(58) Field of Classification Search ............... None
See application file for complete search history.

(56) References Cited

U.S. PATENT DOCUMENTS

| | | | |
|---|---|---|---|
| 6,473,431 B1 | 10/2002 | Perlman et al. | |
| 6,721,290 B1* | 4/2004 | Kondylis et al. | 370/329 |
| 6,721,344 B2 | 4/2004 | Nakao et al. | |
| 6,826,621 B1 | 11/2004 | Kephart et al. | |
| 7,190,696 B1 | 3/2007 | Manur et al. | |
| 2001/0024443 A1* | 9/2001 | Alriksson et al. | 370/401 |
| 2002/0075807 A1* | 6/2002 | Troxel et al. | 370/238 |
| 2002/0101821 A1 | 8/2002 | Feldmann et al. | |
| 2005/0030921 A1* | 2/2005 | Yau | 370/329 |
| 2006/0140111 A1 | 6/2006 | Vasseur et al. | |
| 2006/0159082 A1 | 7/2006 | Cook et al. | |
| 2006/0159095 A1 | 7/2006 | Cook et al. | |
| 2007/0019593 A1* | 1/2007 | Sarkar | 370/338 |

OTHER PUBLICATIONS

U.S. Appl. No. 10/096,154, filed Feb. 2, 2003, Navas.
J. Moy, Open Shortest Path First (OSPF) Version 2, Request for Comments, Apr. 1, 1998, p. 185, No. 2328, Publisher: Internet Engineering Task Force, Published in: Internet (www.ietf.org).

* cited by examiner

*Primary Examiner*—Bob A Phunkulh
(74) *Attorney, Agent, or Firm*—Patent Capital Group

(57) ABSTRACT

Techniques for sharing routing information over a network include determining whether the scale of a flooding domain exceeds a threshold. If so, then a router announcement message is sent over a particular link. The message indicates the local router is a flooding domain border router (FDBR). Summary routing information is determined with less than a certain level of detail used in the flooding domain for routers connected to the local router through links different from the particular link. The summary routing information is sent over the particular link in a link state message that includes type data that indicates summary routing information that crosses a FDBR. These techniques allow automatic favorable scaling of domains of shared routing information as the size of a mobile ad hoc network grows.

31 Claims, 8 Drawing Sheets

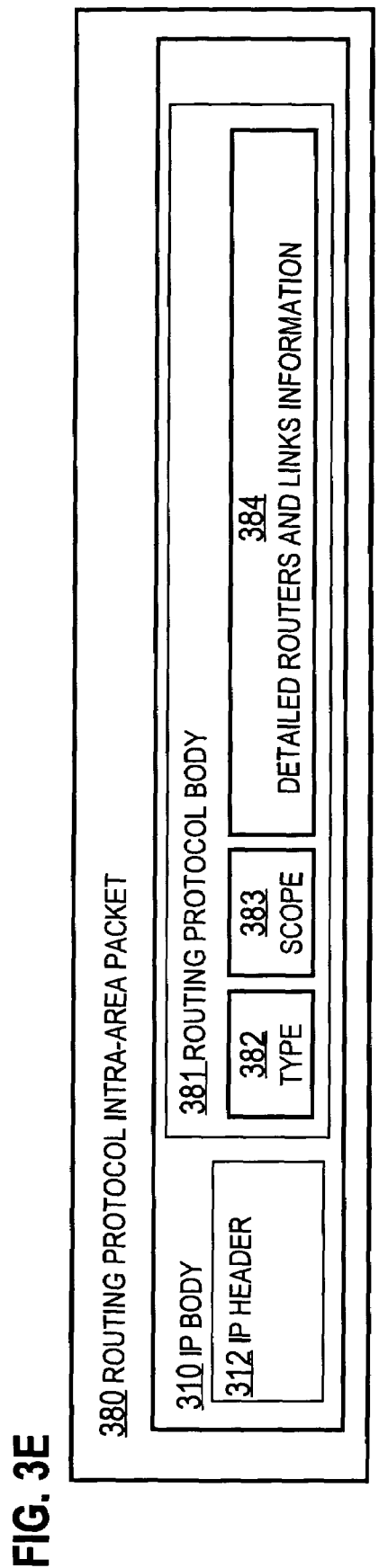

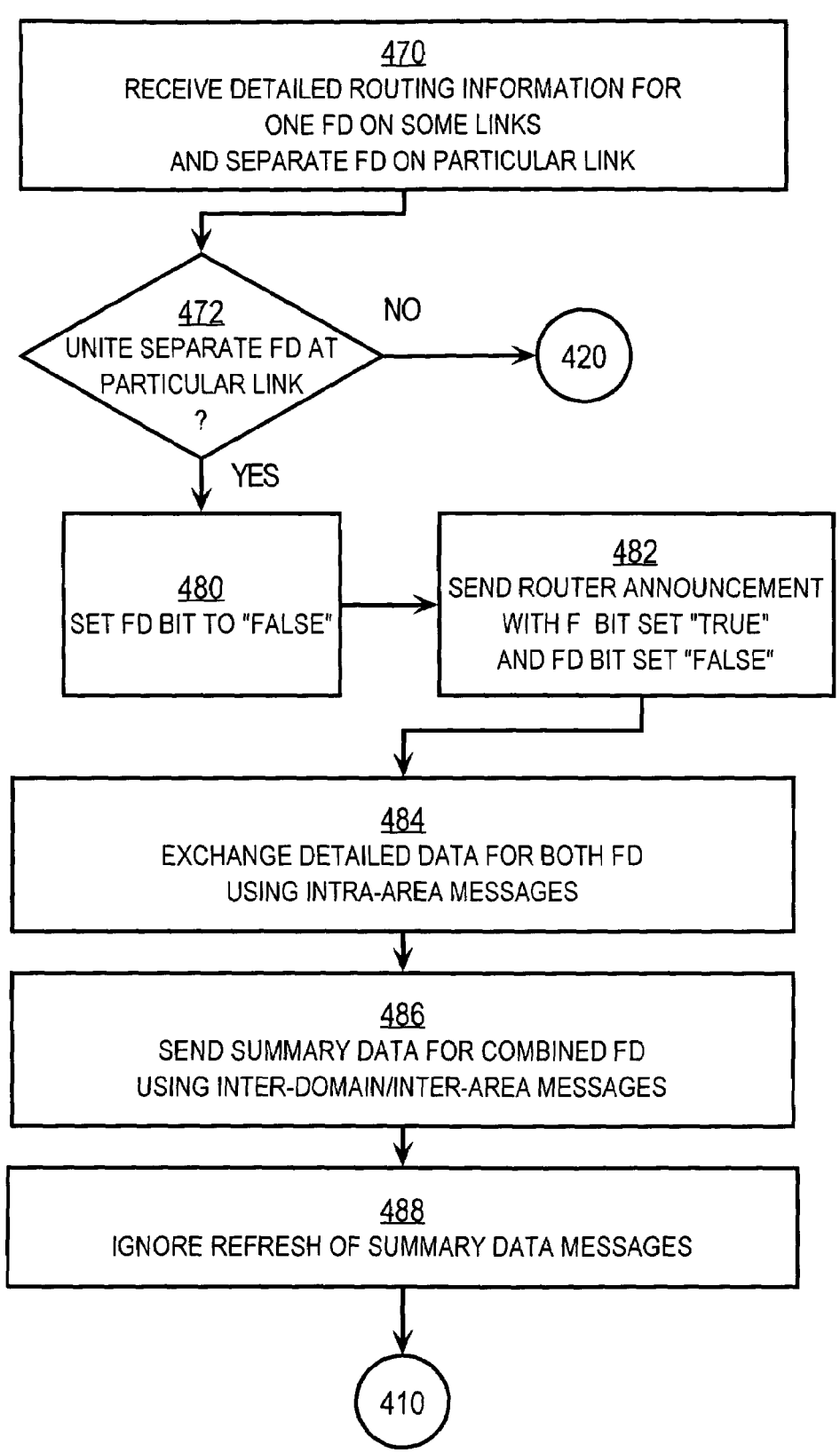

METHOD AND APPARATUS FOR AUTOMATIC SUB-DIVISION OF AREAS THAT FLOOD ROUTING INFORMATION

BACKGROUND OF THE INVENTION

1. Field of the Invention

The present invention relates to passing routing information among mobile intermediate network nodes, such as in a wireless mobile ad hoc network (MANET).

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). To reduce the consumption of network resources and improve scalability, some routing protocols divide a large network up into smaller subnetworks. For example, the OSI protocol suite and the Open Shortest Path First (OSPF) routing protocol divide a network into autonomous systems and areas. An autonomous system (AS) is a portion of a network under the network administration of a single authority, such as an enterprise or Internet service provider (ISP). An AS is divided into areas. Each area is a group of contiguous subnetworks and attached end nodes specified by a network administrator, usually manually. In OSI, routers within an AS communicate with each other using an intermediate system to intermediate system (IS-IS) protocol. According to IS-IS, routing within an area (level 1 routing) uses link-state data that distinguishes each link on each router in the area. Routing between areas (level 2 routing) goes through a level 2 router that aggregates the addresses reachable through that level 2 router. By aggregating routing information for addresses reachable over many links of a level 2 router, the amount of network resources consumed to maintain link-state data and make routing decisions can be reduced and network scalability can be enhanced. The division of routers into areas is conventionally a manual process performed by human network administrators.

Mobile ad-hoc networks (MANETs) involve mobile routers that can join and depart a network or area using wireless communications links. Each router is configured with an area, called herein a configured area or a base area, when the router is configured for routing network communications. Mobile routers are given a base area that matches the bane area given to other routers expected to operate closely together because of some affinity that can be identified, such as ownership by a particular enterprise or organization. For example, all mobile routers for a municipal fire, rescue and police department are configured with the same base area.

According to existing routing protocols, a router, including a mobile router, accepts attempts by an adjacent router that belongs to the same area to form an adjacency relationship and initiate an exchange of routing information for the area. Such attempts begin, for example, in OSPF with a HELLO message that includes data that indicates the area to which the router that sends the HELLO message belongs. After an adjacency relationship is formed, all detailed routing information for the area is exchanged according to level one routing.

While suitable for manually configured and strictly managed networks, this approach suffers some deficiencies when applied in a MANET context, in which the number of adjacent mobile routers in an area is not under control of a network administrator, but instead subject to operational considerations. For example, the number of routers belonging to an area may exceed the number at which the network operates efficiently, and cause the network to devote much or most of its resources to passing routing information. With mobile routers, the amount of information that is expected to be passed during a particular time interval is greater than in wired networks in which router adjacencies are relatively stable. As routers move quickly in a MANET, adjacencies are made and broken often, thus changing network topology and causing the flooding of detailed routing information across all routers belonging to the routing area. For example, during a crisis, fire, rescue and police entities, with their mobile routers, converge on a scene of the crisis. Hundreds of adjacencies are suddenly formed, dozens of which change per second as various elements of the response move into and out of range of each other. A MANET can enter a catastrophic state in which all resources are devoted to exchanging routing information in control plane packets and few or no resources are left to handle emergency information in data plane traffic.

Based on the foregoing, there is a clear need for techniques to utilize changing links by sharing routing information with other routers that belong to the same area, which techniques do not suffer the deficiencies of prior approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3E is a block diagram that illustrates a routing protocol intra-area packet, according to an embodiment;

FIG. 4A and FIG. 4B constitute a flow diagram that illustrates at a high level a method for sharing routing information among two or more automatically divided routing information flooding domains, according to an embodiment.

DETAILED DESCRIPTION

Techniques are described for sharing routing information among mobile routers belonging to the same area. For purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In an internetwork, networks in different autonomous systems (AS) also route data packets among each other. In general, the network nodes in an autonomous system are manually configured with an Autonomous System identifier (ASID) and pass only further summarized level 3 routing information between different AS. Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols OSPF and IS-IS described above. Another IGP, developed by Cisco Systems of San Jose, Calif. for use in its routers, is the Enhanced Interior Gateway Routing Protocol (EIGRP). A level 3 routing protocol is used to exchange route summary and routing policy information across AS borders. For example, the Border Gateway Protocol (BGP) is a level 3 routing protocol. The BGP sends summary and policy information between adjacent boundary gateway nodes in different ASs using the External BGP (EBGP). The BGP sends summary and policy information between different boundary gateways in the same AS using the Internal BGP (IBGP).

In the following description, embodiments of the invention are described in the context of wireless routers using link-state flooding areas according to OSPF or IS-IS. However, the invention is not limited to this context and these protocols, but may be applied in any network and protocol that involves domains of mobile intermediate network nodes in a packet-switched communications network in which a different level of routing information detail is exchanged between domains from what is exchanged within a domain. For example, IS-IS or other IGP protocols may be used within a domain but a BGP or other summary used between domains. In some embodiments, at least some of the intermediate network nodes are wired nodes that determine domains as they are wired together or encounter wireless nodes.

1.0 Network Overview

Figure 1:
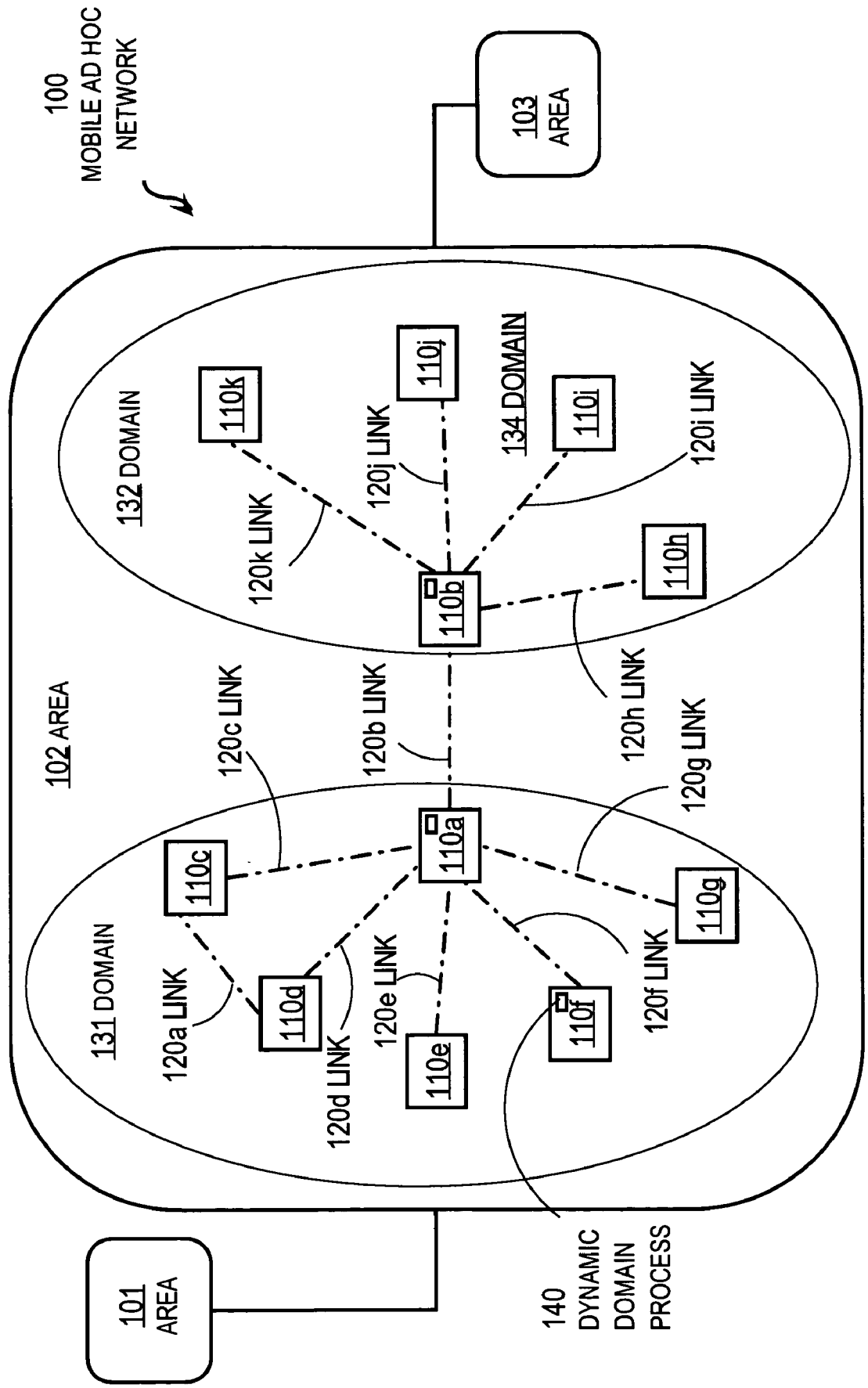
FIG. 1 is a block diagram that illustrates a mobile ad hoc network, according to an embodiment.

FIG. 1 is a block diagram that illustrates a mobile ad hoc network 100, according to an embodiment. Network 100 includes multiple areas, such as OSPF flooding areas and IS-IS flooding areas, including flooding area 101, flooding area 102 and flooding area 103 (collectively referenced hereinafter as areas 101). Area 102 of network 100 includes wireless routers 10a, 110b, 110c, 110d, 110e, 110f, 110g, 110h, 110i, 110j, 110k, collectively referenced hereinafter as routers 110. The routers communicate by wireless links, including wireless links 120a, 120b, 120c, 120d, 120e, 120f, 120g, 120h, 120i, 120j, 120k, collectively referenced hereinafter as links 120. To support routing of data packets between end nodes, not shown, the routers 110 pass routing information among themselves in a routing protocol, such as the OSPF protocol. Between areas 101, routing information is shared with less detail, as summary information. Although eleven routers and 11 links in three areas are shown in network 100 of FIG. 1 for purposes of illustration, in other embodiments, a network includes more or fewer routers communicating over more or fewer links in more or fewer areas.

Wireless links 120 represent physical or logical links. Some wireless links use different physical channels, such as different radio frequencies, or directional antennas that spatial segregate signals at the same frequency, or time gating that reserves different time slots on the same frequency for different links. Some wireless links send all traffic on the same frequency in all directions, one data packet at a time, and logically segregate traffic onto different logical links based on a label included in the data packet; such links are called logical links.

When networks are wired together, a network administrator assigns each node to an area during configuration, a manual process that grows tedious as the number of nodes increase. The same process, though tedious, works for fixed wireless routers, such as access points installed in homes and buildings. However, with mobile wireless routers, it is impractical for a human to follow the routers around and reassign them to different areas as they move—such a process would render the routers useless for mobile operations.

Instead, each wireless router is configured with a base area. Routers that are expected to be in each other's vicinity in the field are configured with the same base area.

Currently, when two nodes come within wireless range on a particular link, they each send a control plane message that invites an adjacency relationship and indicates that it is a router belonging to a particular area. If both nodes belong to the same area, then the nodes form an adjacency relationship and share routing information as members of the same area. If either belongs to a different area, the nodes ignore routing control packets from each other.

If one of the two with different areas is an area boundary router (ABR), then the ABR sets up an inter-area link. The ABR summarizes routing information for its area and passes only summary information to the other. The ABR acts as if it is a member of both areas and gets full routing information from both sides, and must maintain separate detailed routing information for the two areas. The ABR sends only summary information from one area into the other. The link between the ABR and the foreign router then becomes a link in the foreign area. OSPF areas and ABRs are described in more detail in Requests For Comments (RFC) 2328 available from the Internet Engineering Task Force, (IETF). RFC 2328 and other RFC documents are available at the IETF web site at domain ietf.org in directory rfc by inputting a rfc number in a dialog box. The entire contents of RFC 2328 are hereby incorporated by reference as if fully set forth herein.

In mobile ad hoc networks, it is difficult to ensure that the number of routers that belong to the same flooding area in communication at one time do not exceed a practical limit at which routing protocol control plane traffic interferes with data plane traffic. If one selects a small number of routers for each area then many areas are used to provide mobile routers to a large organization. If only a small fraction are in communication at any one time, then the chances are that many communicating routers are in different areas and require the overhead processing of several ABRs, thus losing the flexibility of link state routing within an area. If one selects a large number of routers for each area, such as all mobile routers for a large organization, then the problems of too many routers, describe above, can occur, often in a crisis situation when the data plane traffic is most important.

According to the illustrated embodiments of the invention, a dynamic domain process 140 is included on routers (e.g. routers 110), so that an area (e.g., area 102) can be divided into two or more flooding domains (e.g., domain 131 and domain 132 depicted in FIG. 1). The routing information passed between flooding domains is summary information at a lower level of detail than is passed within a flooding domain. Thus less detailed information is passed across all routers 110 in area 102 then is passed if this division into multiple flooding domains is not made. As a result, performance of network 100 is preserved even with a large number of routers 110 active in area 102. For example, if router 110k is moving quickly, breaking adjacency with router 110b but forming adjacency with 110j, then this information is flooded only over flooding domain 132, and all routers in flooding domain 131 remain quiescent. When a flooding area is not divided into domains, the flooding area itself is considered a flooding domain. In the current standard for OSPF and IS-IS, the entire area is the only flooding domain supported.

2.0 Structural Overview

Figure 2:
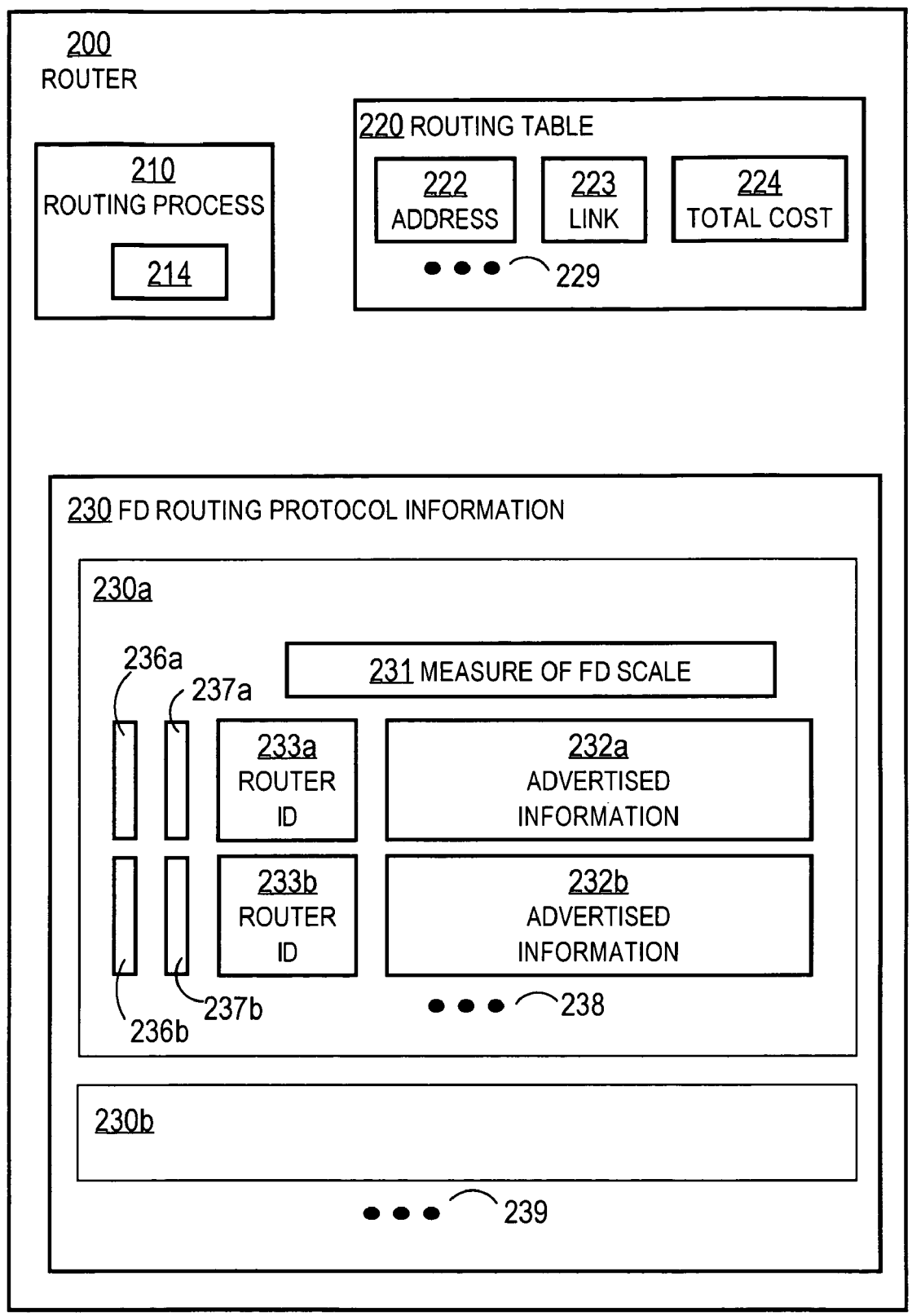
FIG. 2 is a block diagram that illustrates a router, according to an embodiment.

FIG. 2 is a block diagram that illustrates a router 200, according to an embodiment. Router 200 includes a routing process 210, routing table 220, and flooding domain routing protocol information data structure 230, hereinafter referenced as FDRP structure 230.

The routing process 210 executes on a processor, such as a general purpose processor executing sequences of instructions that cause the processor to perform the routing process. According to embodiments of the invention, routing process includes process 214 to form flooding domains dynamically as described in more detail below with respect to FIG. 4A and FIG. 4B. The routing process 210 stores and retrieves information in the routing table 220 based on information received in one or more routing protocol update messages that are stored in FDRP structure 230.

A routing table 220 is a data structure that includes for each destination that can be reached from the router 200, an address field 222, a link field 223 and zero or more attribute fields. In the illustrated embodiment, the attributes fields include a total cost field 224. Fields for other destinations in routing table 220 are indicated by ellipsis 229.

The FDRP structure 230 is a data structure that includes data for each flooding domain that borders the router. FDRP record 230a for a first flooding domain includes, for each FDRP update message over a link with a router in that flooding domain, advertised information field (e.g., advertised information fields 232a, 232b, collectively referenced hereinafter as advertised information fields 232); and a router identifier (ID) field (e.g., router ID fields 233a, 233b, collectively referenced hereinafter as router ID fields 233). In the illustrated embodiment, FDRP structure 230 also includes flooding domain capability flag fields 236a, 236b (collectively referenced hereinafter as domain capable flag fields 236); and flooding domain border flag fields 237a, 237b (collectively referenced hereinafter as domain border flag fields 237). Fields for other routers in FDRP record 230a are indicated by ellipsis 238.

For routers that serve as boundaries between two or more flooding domains, including routers that serve as ABRs, a separate FDRP record is kept for each such flooding domain. In the illustrated embodiment, router 200 includes FDRP record 230b for a second flooding domain and additional FDRP records for additional flooding domains indicated by ellipsis 239. Data received from a different protocol, such as an IGP protocol is stored in different data structures, not shown.

Data structures may be formed in any method known in the art, including using portions of volatile memory, or non-volatile storage on one or more nodes, in one or more files or in one or more databases accessed through a database server, or some combination. Although data structures 220, 230 are shown as integral blocks with contiguous fields, e.g. fields 232, in a particular order for purposes of illustration, in other embodiments one or more portions of fields and data structures 220, 230 are stored as separate data structures in the same or different order on the same or different multiple nodes that perform the functions of router 200.

The router ID field 233 holds data that indicates a router in the flooding domain from which protocol information for the particular protocol was received. The advertised information field 232 holds data that is shared among routers in a flooding domain from that router according to the protocol. The domain capable flag field 236 holds data that indicates whether the associated router indicated in the router ID field 233 is capable of supporting multiple flooding domains within a flooding area. This information is provided by an F-bit in router announcement packets for the protocol, as described in the next section. The domain capable flag field 236 holds data that indicates whether the associated router indicated in the router ID field 233 is capable of supporting multiple flooding domains within a flooding area. This information is provided by a F-Bit in router announcement packets for the protocol, as described in the next section. The domain border flag field 236 holds data that indicates whether the associated router indicated in the router ID field 233 is serving as a border between multiple flooding domains within a flooding area. This information is provided by a FD-bit in router announcement packets for the protocol.

The routing process 210 uses the information in the FDRP structure 230 and data structures (not shown) for the inter-area protocols, such as IGP and EIGRP, to construct the routing table 220. On an ABR, the routing process also summarizes data from FDRP structure 230 to send in a different protocol to routers in a different area. As in described in more detail in a later section, process 214 summarizes data from FDRP structure 230 to send to routers in a different flooding domain within the same area.

In the illustrated embodiment, the router 200 includes in FDRP records, such as record 230a, a measure of FD scale field 231. The measure of FD scale is used to help determine when a flooding area is of too large a scale to act efficiently. In the illustrated embodiments, the measure of scale is the number of routers in the flooding domain, called the size of the domain. In other embodiments other measures of the scale of the flooding domain are used, such as a network radius of the flooding domain. The network radius reflects the number of routers a packet passes through to traverse between the routers that are farthest apart. In some other embodiments, a different measure is used, such as the number of bytes transferred through the router during the last flooding event or a percentage of time processing topology changes. In the illustrated embodiment, the size of the flooding domain is determined by counting the number of advertisements in the FDRP record, e.g. record 230a.

3.0 Modified Control Plane Packets

In the illustrated embodiment, routing protocol control plane packets are modified to support automatic division and coalescence of flooding domains of routers within which routing information is shared at a higher level of detail than is shared between different flooding domains.

Figure 3A:
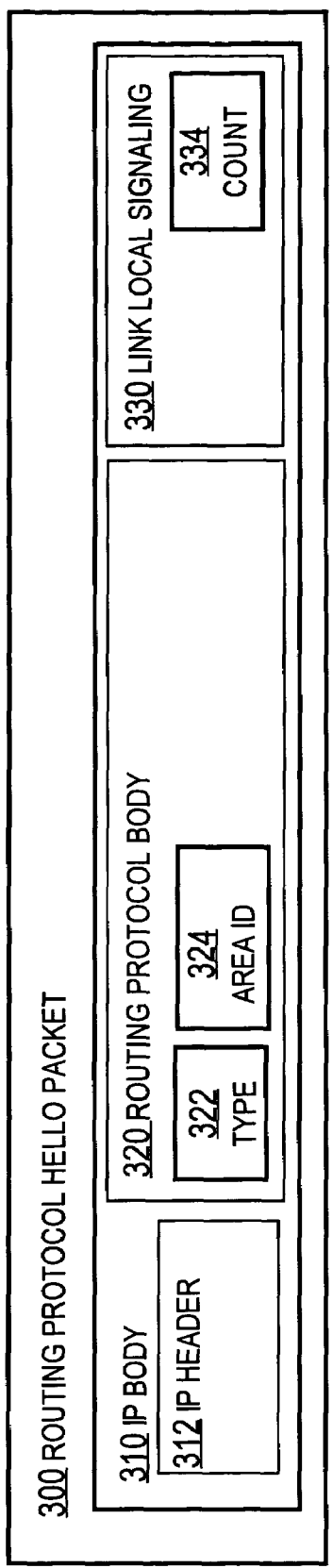
FIG. 3A is a block diagram that illustrates a routing protocol HELLO packet, according to an embodiment.

FIG. 3A is a block diagram that illustrates a routing protocol adjacency invitation packet (called a HELLO packet 300, hereinafter for convenience), according to an embodiment. In the illustrated embodiment, the HELLO packet 300 is a modified OSPF HELLO packet. The packet 300 includes an Internet Protocol (IP) body field 310 that includes an IP header field 312 and IP payload. The IP payload includes a routing protocol body field 320 and a link local signaling (LLS) field 330.

The routing protocol body field, such as an OSPF message, includes a type field 322 and an area ID field 324. The type field 32 holds data that indicates the packet is a HELLO packet, inviting the recipient of the packet to form an adjacency relationship with the sending packet. The HELLO packet is not forwarded to another router and so always indicates a direct communication between the sending router and the recipient router. The area ID field 324 holds data that indicates an area to which the sending router belongs, such as a configured area ID. A router that is not an ABR ignores a HELLO packet that indicates a different area ID in field 324 than the recipient's area ID.

As is well known, information not included in the routing protocol body 320 of a given type can nonetheless be passed in the same IP body 310. The routing protocol body frame 320 includes a length field (not shown) that indicates the length of the routing protocol body field 320. The IP header field 312 includes an IP length field (not shown) that indicates a length of the IP body field. The difference between the standard length of the IP header and the difference between these two lengths gives the length of the LLS field 330. The LLS field can thus be made long enough to pass additional information in the HELLO packet 300.

According to the illustrated embodiment, the LLS field 330 includes a count field 334. The count field 334 holds data that indicates the measure of scale of the flooding domain for the sending router. It is assumed, for purposes of illustration, that the measure of scale in the number of routers in the flooding domain. Thus, the count field 334 holds data that indicates the number of routers in the flooding area to which the sending router belongs. This is the actual number of routers that belong to the area and are communicating with the sending router, and is expected to include only a portion of the number of routers configured with the same area ID by a network administrator. This is the same value that is stored in the measure of FD scale field 231 for the flooding domain to which the sending router belongs and to which the recipient router is being invited.

Figure 3B:
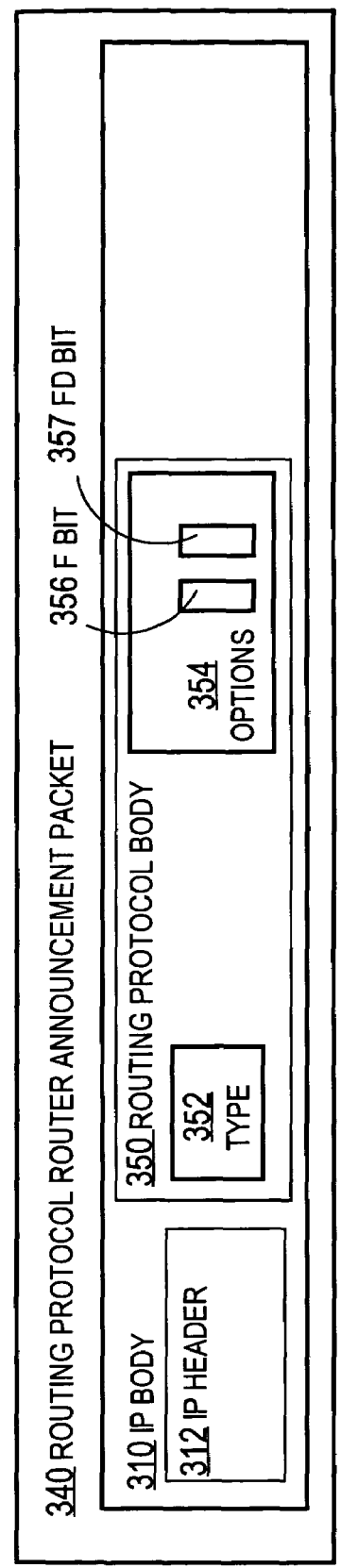
FIG. 3B is a block diagram that illustrates a routing protocol router announcement packet, according to an embodiment.

FIG. 3B is a block diagram that illustrates a routing protocol router announcement packet 340, according to an embodiment. In the illustrated embodiment, the router announcement packet 340 is a modified OSPF router link state advertisement (LSA) packet (router LSA packet). In some embodiments, the announcement packet 340 is a modified IS-IS router link state protocol data unit (LSP) packet (router LSP packet). The router announcement packet 340 includes an IP body field 310 that includes an IP header field 312 and IP payload. The IP payload includes a routing protocol body field 350.

The routing protocol body field 250, such as an OSPF message, includes a type field 352 and an options field 354. The type field 352 holds data that indicates the packet is a router announcement packet, allowing the recipient of the packet to record information about the router. The options field 354 holds data that indicates optional information about the sending router in FDRP structure 230. According to the illustrated embodiment, the definitions for options field 354 are modified to include definitions for a F-bit 346 and a FD-bit 357.

The F-bit is used to indicate that the sending router supports multiple flooding domains within an area. The F-bit holds data (e.g., the binary value 1) that indicates "True" when the router supports multiple flooding domains in an OSPF or IS-IS flooding area; and holds data (e.g., the binary value 0) that indicates "False" when the router only supports complete routing information flooding in an OSPF or IS-IS flooding area. The F-bit is defined so that a router that follows an unmodified standard OSPF or IS-IS protocol has a "False" value, by default, in the F-bit.

The FD-bit is used to indicate that the sending router is a boundary between multiple flooding domains within an area. Such a router is called herein a flooding domain border router (FDBR). The FD-bit holds data (e.g., the binary value 1) that indicates "True" when the router is a FDBR; and holds data (e.g., the binary value 0) that indicates "False" when the router is not a FDBR. The FD-bit is ignored if the F-bit is set to "False."

Figure 3C:
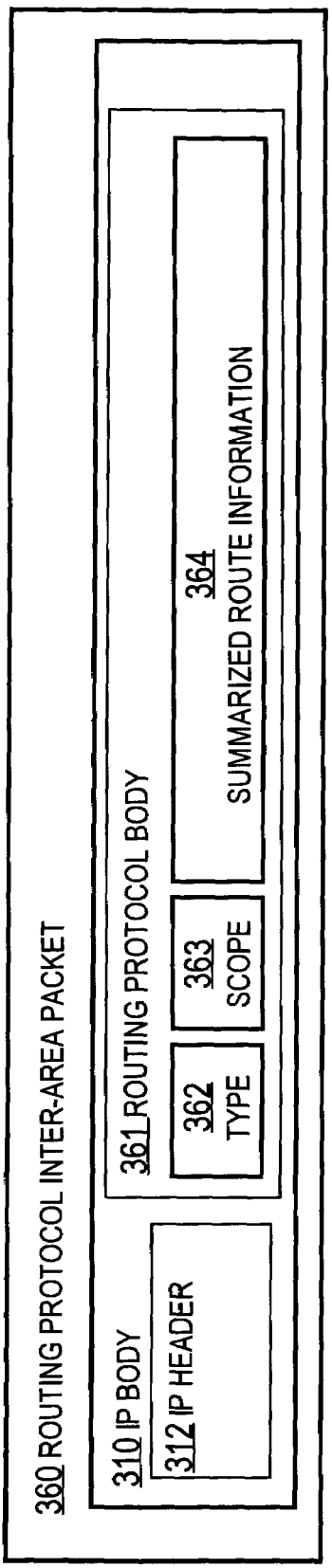
FIG. 3C is a block diagram that illustrates a routing protocol inter-area packet, according to an embodiment.

FIG. 3C is a block diagram that illustrates a routing protocol inter-area packet 360, according to an embodiment. In the illustrated embodiment, the inter-area packet 360 is a modified OSPF LSA packet. In some embodiments, the inter-area packet 360 is a modified IS-IS LSP packet. The inter-area packet 360 includes an IP body field 310 that includes an IP header field 312 and IP payload. The IP payload includes a routing protocol body field 361.

The routing protocol body field 361, such as an OSPF update message, includes a type field 362, a flooding scope field 363 and summarized route information field 364. The type field 362 holds data that indicates the packet is an inter-area packet, allowing the recipient of the packet to store the data and use it properly to update the routing table. According to the illustrated embodiment, the definitions for flooding scope field 363 are modified to include a new value for a Total Area Scope. In an illustrated embodiment, the Total Area Scope is indicates by using a reserved value, 1/1, for an S1/S2 field in the OSPF standard. The new value for Total Area Scope indicates that the summarized data in the packet is based on data flooded through the entire area, i.e., that the area is not subdivided into two or more flooding domains. This is the standard scope for OSPF and IS-IS at the time of this writing and is indicated by a current standard value called Area Scope. According to the illustrated embodiment, however, the original value for Area Scope is re-interpreted and now indicates that the summarized data in the packet is based on data flooded through only one flooding domain inside an OSPF area, i.e., that the area is divided into two or more flooding domains.

Figure 3D:
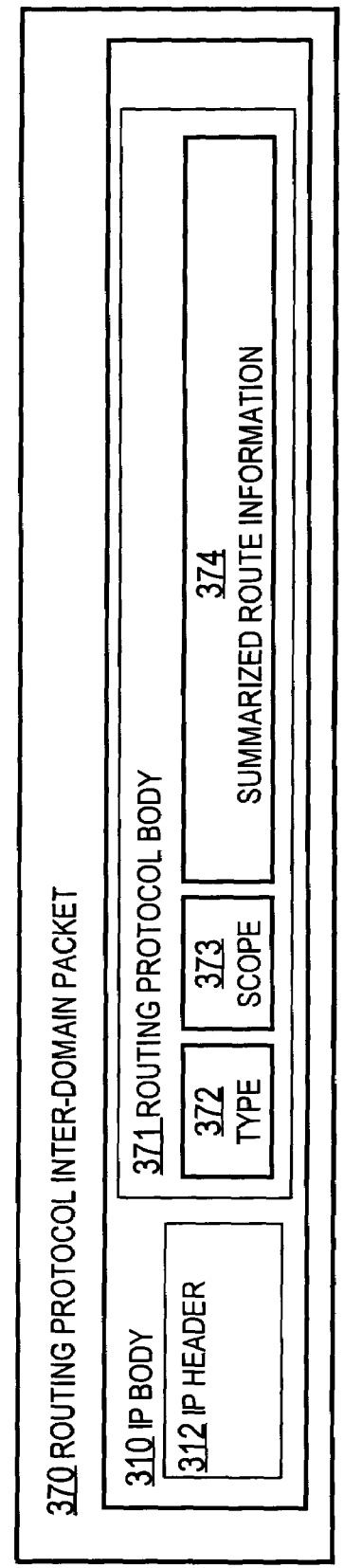
FIG. 3D is a block diagram that illustrates a routing protocol inter-domain packet, according to an embodiment.

FIG. 3D is a block diagram that illustrates a routing protocol inter-domain packet 370, according to an embodiment. In the illustrated embodiment, the inter-domain packet 370 is a modified OSPF LSA packet. In some embodiments, the inter-domain packet 370 is a modified IS-IS LSP packet. The inter-domain packet 370 includes an IP body field 310 that includes an IP header field 312 and IP payload. The IP payload includes a routing protocol body field 371.

The routing protocol body field 371, such as an OSPF update message, includes a type field 372, a flooding scope field 373 and summarized route information field 374. The type field 372 holds data that indicates the packet is an inter-domain packet, allowing the recipient of the packet to store the data and use it properly to update the routing table. A new code for type is introduced to the standard to indicate this new type of packet, an inter-domain packet. The summarized route information in an inter-domain packet is always based on flooding data within the domain, and therefore the flooding scope field 373 always holds a value indicating Area Scope. The format of data in the summarized route information field 374 is the same as the format in the summarized route information field 364 for an inter-area packet. Thus inter-domain packet 370 looks like an inter-area packet 360 except for the value in the type field 372 which is always different for the two packets. (Note that a value of Total Area Scope in a flooding scope field also distinguishes the two packets, because only an inter-area packet 360 may contain the Total Area Scope value in the flooding scope field.)

FIG. 3E is a block diagram that illustrates a routing protocol intra-area packet 380, according to an embodiment. In the illustrated embodiment, the intra-area packet 380 is a modified OSPF LSA packet. In some embodiments, the intra-area packet 380 is a modified IS-IS LSP packet. The intra-area packet 380 includes an IP body field 310 that includes an IP header field 312 and IP payload. The IP payload includes a routing protocol body field 381.

The routing protocol body field 381, such as an OSPF update message, includes a type field 382, a flooding scope field 383 and detailed routers and links information field 384. The type field 382 holds data that indicates the packet is an intra-area packet, allowing the recipient of the packet to store the data and use it properly as detailed routers and links information to update the routing table and a record (e.g., record 230a) in FDRP structure 230. A standard code for intra-area type indicates this type of packet. The format of data in the detailed routers and links information field 384 is the same whether the details are for a domain or the whole OSPF/IS-IS flooding area. Thus, the intra-area packet 380 is always used for details of a single flooding area, whether that flooding area is the same as the whole OSPF/IS-IS flooding area or a flooding domain portion of the whole OSPF/IS-IS flooding area. A value of Total Area Scope in the flooding scope field 383 indicates that the detailed routers and links information 384 is for the whole OSPF/IS-IS flooding area. A value of Area Scope in the flooding scope field 383 indicates that the detailed routers and links information 384 is for only a portion of the OSPF/IS-IS flooding area that constitutes one flooding domain.

Although message and fields are shown in FIG. 2 as contiguous blocks of data arranged in a particular order for purposes of illustration, in other embodiments one or more messages, fields or portions thereof are arranged in a different order in one or more messages.

4.0 Method for Sharing Routing Information

According to the illustrated embodiment, a flooding domain for sharing routing information at a certain level of detail is automatically generated or coalesced based on the measure of scale of the current flooding domains. This method uses the structures and control plane message fields described above.

Figure 4A:
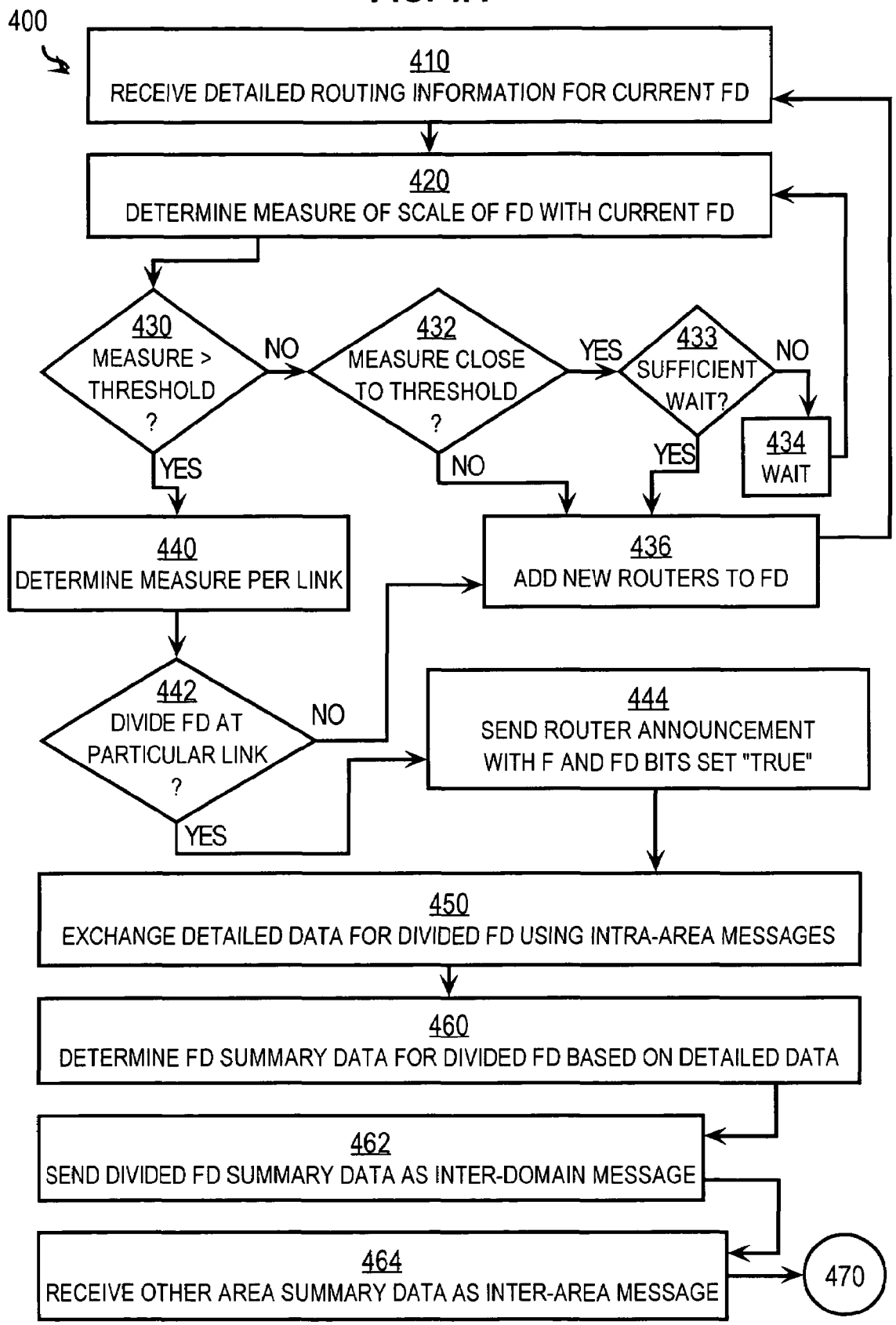

FIG. 4A and FIG. 4B constitute a flow diagram that illustrates at a high level a method 400 for sharing routing information among two or more automatically divided routing information flooding domains, according to an embodiment. Although steps are shown in FIG. 4A and FIG. 4B in a particular order for purposes of illustration, in other embodiments one or more steps are performed in a different order or overlapping in time on one or more processors executing in series or in parallel, or one or more steps are omitted, or the steps are changed in some combination of ways.

For purposes of illustration it is assumed that routers 110 are arranged as depicted in FIG. 1 except that the link 120b between routers 110a and 110b is not yet available. In this circumstance, domain 131 is a flooding area for area 102. Similarly domain 132 is a separate flooding area for area 102. The routers in each domain pass detailed routing information to every other router in the same domain. According to the current standard of OSPF and IS-IS protocols, when link 120b is available, domains 131 and 132 merge into one flooding area 102. It is further assumed that all routers 110 support dividing a flooding area into two or more flooding domains. This can be determined as described in step 410.

In step 410 detailed routing information for a current flooding domain is received at a local router. Step 410 includes, first establishing adjacency with each router, during which a router announcement packet 340 is sent. If the router and all its neighbors support division of flooding areas, the F-Bit field 356 in each holds data indicating the value "True." If any routers in the flooding domain do not support dividing a flooding area into a flooding domain, then the F-Bit field 356 in at least on packet 340 holds data indicating the value "False," and the following steps are skipped. The current flooding domain grows without limit.

In embodiments in which the OSPF or IS-IS flooding area is the current flooding domain, during step 410, detailed information is exchanged, for example, by receiving a routing protocol intra-area packet 380 in which the scope field 383 indicates Total Area Scope. In embodiments in which a less than complete portion of the OSPF or IS-IS flooding area is the current flooding domain, step 410 is performed, for example, by receiving a routing protocol intra-area packet 380 in which the scope field 383 indicates Area Scope. In an example of the illustrated embodiment, while link 120*b* is unavailable, router 110*a* receives (and sends) detailed routing information in field 384 of routing protocol intra-area packet 380 in which the scope field 383 indicates Total Area Scope. Similarly, while link 120*b* is unavailable, router 110*b* receives (and sends) detailed routing information in field 384 of routing protocol intra-area packet 380 in which the scope field 383 indicates Total Area Scope.

In step 420, a router in the flooding domain determines a measure of scale of a flooding domain that includes its current flooding domain. For example, the size of the current flooding domain expressed as the number of the routers in the current flooding domain is determined. It is assumed for purposes of illustration that router 110*b* determines that the size is 6, based on the number of routers for which intra-area routing information has been obtained, as stored in measure of FD scale field 231. In some embodiments, step 420 is only determined at the time a particular event, such as a detected change in the network, or the receipt of a HELLO packet.

The determination of the measure of scale depends on the event. In the case of receipt of a HELLO packet, determining the measure of scale includes determining the measure of the flooding domain if the router were to accept the invitation and form the adjacency relationship. This determination depends on the measure of scale associated with the router requesting the adjacency by sending the HELLO packet. According to the illustrated embodiment, the measure of scale for the router sending the HELLO packet is included in the count field 334 of the HELLO packet. Thus, in response to the HELLO packet, step 420 includes combining the measure of scale from the count field 334 with the measure of scale in the current flooding domain, in field 231 to determine the measure of scale of a flooding domain that includes the current flooding domain.

For purpose of illustration, it is assumed that such an event triggering step 420 has occurred when router 110*d* sends a HELLO packet to router 110*a*, and the resulting measure of scale is 6 routers. It is noted here that duplicate routers in the two flooding domains can be eliminated by not combining a count from a router that is already listed in the routing information on the local router, e.g., in record 230*a* of FDRP structure 230.

In step 430, it is determined whether the measure of scale exceeds a threshold. The threshold is configured on the routers and is set at a value above which performance of a flooding area is expected to degrade due to excessive flooding of routing information. For simplicity of the illustration, it is assumed that the threshold is 10. If it is determined in step 430 that the measure is not greater than the threshold, control passes to step 432. In an example of the illustrated embodiment, the measure is 6, which is not greater than the threshold 10, so control passes to step 432.

In step 432, it is determined whether the measure is close to the threshold, for example within one router of the threshold. If so, then it is possible that while the current router and its flooding area are being merged with the flooding domain of the new router 110*d*, another router is nearly simultaneously being added at another router in the current flooding domain, for example at router 110*g*. If both are added, the combination might very likely exceed the threshold. Therefore it is best to wait a sufficient time until the effect of any prior merging is detectable before merging flooding domains that bring the total near the threshold. Thus, if it is determined in step 432 that the measure is close to the threshold, control passes to step 433. For example, if it is assumed for purposes of illustration that the number of routers in the current flooding domain were 8 before the HELLO packet from router 110*d*, then the combined flooding domain would be 9 if router 110*d* is added. Because 9 is close to the threshold 10, control passes to step 433 and following steps to ensure a long enough wait that a different router attempting to merge with the flooding domain has had time to complete the merge.

In step 433, it is determined whether the wait has been sufficient. If not, control passes to step 434 to wait until another merge could be detected. Control then passes back to step 420 to again determine the measure of scale of the flooding domain.

If it is determined, in step 433, that the wait has been sufficient, then control passes to step 436. In step 436 an adjacency is accepted with the router. If the router is a new router, then it and all the routers in its flooding domain are added to the current flooding domain. Control then passes to step 410 to continue to exchange detailed routing information within the flooding domain including any new routers.

If it is determined, in step 430, that the measure exceeds the threshold, then control passes to step 440 and subsequent steps to form a flooding domain border router (FDBR) at one of the routers involved. For example, when link 120*b* becomes available, router 120*a* receives a HELLO packet 300 from router 110*b*. The count field 334 indicates that 5 routers are in the flooding domain to which router 110*a* is invited to join. Since router 110*b* is not already listed in the FDRP record 230*a* stored on router 110*a*, it is known that all five routers are new and should be added to the 6 already in the current flooding domain. In step 420 it is determined that the combined flooding domain would create flooding area 102 with 11 routers. In step 430 it is determined that 11 exceeds the threshold of 10, so control passes to step 440.

In step 440, the measure of flooding domain scope is determined by link in order to determine where best to locate the FDBR. For example, router 110*a* determines that 1 of the 11 is on each of links 120*c*, 120*d*, 120*e*, 120*f* and 120*g*, so little is gained by making one of those a FDBR. However, 5 of the 11 are on link 120*b*; thus link 120*b* adds the highest measure of scale. In some embodiments, step 440 is omitted and it is determined that the link over which the HELLO message is received, e.g., link 120*b*, is to be the FDBR.

In step 442 it is determined whether to divide the flooding domain on the local router at a particular link or the adjacent router on that link. It is noted that the router 110*b* is going through the same process at the same time, having also received a HELLO message form router 110*a* with a value of 6 in the count field 334. It should reach the same conclusion. Either router 110*a* becomes the FDBR or 110*b* becomes the FDBR. Each outcome provides the desired result of not exceeding 10 routers in a flooding domain. In an illustrated embodiment, it is determined to select the router with the higher router ID. In other embodiments, other methods are used to select between router 110*a* and router 110*b*. If it is determined that adjacent router (e.g., router 110*b*) becomes the FDBR, then it is determined in step 442 not to divide the FD at the particular link(e.g., link 120*b*) on the local router (e.g., router 110*a*). Control passes to step 436. In step 436, router 110*b* is added. However, because router 110*b* has become a FDBR, no other routers from domain 132 are added to the flooding domain 131 and the measure is 7 (including router 110*b*).

If it is determined that router 110*a* becomes the FDBR, then it is determined in step 442 to divide the FD at the particular link (e.g., link 120*b*) on the local router (e.g., router 110a). Control passes to step 444 and subsequent steps to make the local router (e.g., router 110) the FDBR.

In step 444, the local router sends a router announcement packet 340 in which the F-bit and the FD-bit are both set. This signals that the local router (e.g., router 110a) is a FDBR. The local router establishes a new FDRP record 230b for the new flooding domain (e.g., domain 132).

In step 450, detailed routing information is exchanged with both of the flooding domains (e.g., flooding domain 131 and flooding domain 132, collectively referenced as the divided flooding domains that divide area 102). Detailed routing information received over the particular link (e.g., link 120b) from the new router (e.g., router 110b) is received in intra-area packet 380 and stored in the new FDRP record 230b on the local router (e.g., router 110a) for the new flooding domain (e.g., domain 132). As before, detailed routing information received over the other links (e.g., links 120c, 120d, 120e, 120f, 120g) from the other routers (e.g., routers 110c, 110d, 110e, 110f, 110g) is received in intra-area packets 380 and stored in the current FDRP record 230a on the local router (e.g., router 110a) for the current flooding domain (e.g., domain 131).

In step 460, the local router, as FDBR, determines summary information from the detailed information receive for the divided flooding domains. Using the routing process 210, the local router (e.g., router 110a) determines summary information, such as reachable IP addresses and costs through the current flooding domain (e.g., domain 131) based on the detailed information stored in the current FDRP record 230a, and stores the summary information in a different routing protocol (e.g., IGP) information data structure (not shown). Similarly, using the routing process 210, the local router (e.g., router 110a) determines summary information, such as reachable IP addresses and costs through the new flooding domain (e.g., domain 132) based on the detailed information stored in the new FDRP record 230b, and stores the summary information in a different routing protocol (e.g., IGP) information data structure (not shown).

In step 462, the summary information for the divided flooding domains is sent as inter-domain messages. The summary information for flooding domain 131 is sent over link 120b to router 110b using inter-domain packet 370. The summary information for flooding domain 132 is sent over links 120c, 120d, 120e, 120f, 120g to routers 110c, 120d, 110e, 110f, 110g, respectively, using inter-domain packet 370.

When this data is received at an ABR, e.g., an ABR (not shown) between area 102 and area 101, the ABR sends it into the new area (e.g., area 101) using inter-area packet 360. Because the summary data arrived in an inter-domain packet 370 with a value of Area Scope in the scope field 373, the ABR sets the value of scope field 363 also to data that indicates Area Scope. Thus such inter-area packets indicate that the information summarized is only from one domain within the flooding area and not the whole flooding area. A recipient router then expects and properly handles further summary information for different flooding domains within the same flooding area.

When an ABR receives summary information from a different area (e.g., area 103), that information is passed to routers in the local area (e.g., area 102) in an inter-area packet 360. In step 464, such an inter-area packet 360 is received at the local router (e.g., router 110a). It is assumed for purposes of illustration, that the local node is not an ABR. The inter-area summary is received in one flooding domain and is forwarded to the other. For example, the inter-area packet is received over link 120b with flooding domain 132 and is forwarded by the local router 110a to the routers 110c, 110d, 112e, 110f, 110g in flooding domain 131. The local router (e.g., router 110a) and any other router can tell whether this summary information is for the whole area (e.g., area 103) or just one of several flooding domains within the other area (e.g., area 103) based on the value in the flooding scope field 363. If the value is Total Area Scope, then the summary information is for the whole area (e.g., area 102). If the value is Area Scope, then the summary information is for one flooding domain of two or more flooding domains in the area (e.g., area 103).

In step 470, detailed routing information is received at a FDBR from two or more different flooding domains on corresponding links (or corresponding sets of one or more links). For example, detailed routing information is received at router 110a from flooding domain 131 on links 120c, 120d, 120e, 120f, 120g and from flooding domain 132 on the particular link 120b.

In step 472 it is determined whether to unite separate flooding domains at the particular link. Any method may be used to determine whether to unite. For example, it is determined whether to unite the flooding domains by including link 120b in flooding domain 131. For example, after 24 hours a measure of scale of the flooding domains are examined and if two adjacent flooding domains total a measure of scale much less than the threshold, it is determined to unite the two flooding domains. For example, if routers 110d, 1103, 110f and 110g drop out of flooding domain 131, and router 110h and 110j drop out of flooding domain 132, then the total size of the two domains is 5, much less than 10. If it is determined not to unite separate flooding domains at the particular link, then control passes back to step 420 to determine the size of the flooding domains, separately, upon the appropriate events, if any.

If it is determined, in step 472, to unite separate flooding domains at the particular link, then control passes to step 480. In step 480 the FD bit for the local node is set to a value that indicates "False," and control passes to step 482.

In step 482, a router announcement packet 240 is sent on all links with the F-Bit set to indicate "True," (as usual) and the FD-bit set to indicate "False." This changing the router from an FDBR to an ordinary flooding domain router. As each router receives the router announcement packet 340 with the FD-bit set to indicate "False," that router updates the FD-bit in field 237 of the FDRP record that corresponds to the local router (e.g., router 110a). Control then passes to step 484.

In step 484, detailed routing information for all routers formerly in the two domains is exchanged using the intra-area packet 380. For example the FDRP record 230a and record 230b on the local router (e.g., router 110a) are merged, and the merged data is sent in the intra-area packet 380. In the illustrated embodiment, the scope (Area or Total Area) is determined by looking at the LSAs for the area border routers (ABRs). If a router LSA (type 1) is stored for each router from which summary LSAs (type 3's) are also stored, then the area is also the flooding domain (i.e., the scope is Total Area). Otherwise, the flooding domain is smaller than the area (i.e., the scope is Area).

In step 486, summary data for the combined flooding domains is recomputed and sent in an inter-domain packet or an inter-domain packet 370, depending on the scope of the combined flooding domains.

In step 488, stored intra-area messages and inter-domain messages for the former flooding domains are not refreshed, when scheduled. Control returns to step 410 to update detailed routing information as the network evolves.

In many embodiments, steps 410, 420, 450, 460, 470 and 472 are event driven, i.e., are executed upon the occurrence of an event, such a change in network topology, as well as or in addition to being executed in sequence as shown. In some embodiments, special conditions for uniting multiple flooding domains tested in step 473 are not used. Flooding domains merge naturally as routers from different domains move in proximity and exchange new HELLO messages and contemplate new adjacencies.

Using these steps, a FDBR is dynamically generated (and eliminated) inside configured flooding areas to prevent excessive consumption of network resources to pass routing information in a routing protocol. Such operations are especially useful in large and rapidly changing MANETs.

5.0 Implementation Mechanisms—Hardware Overview

Figure 5:
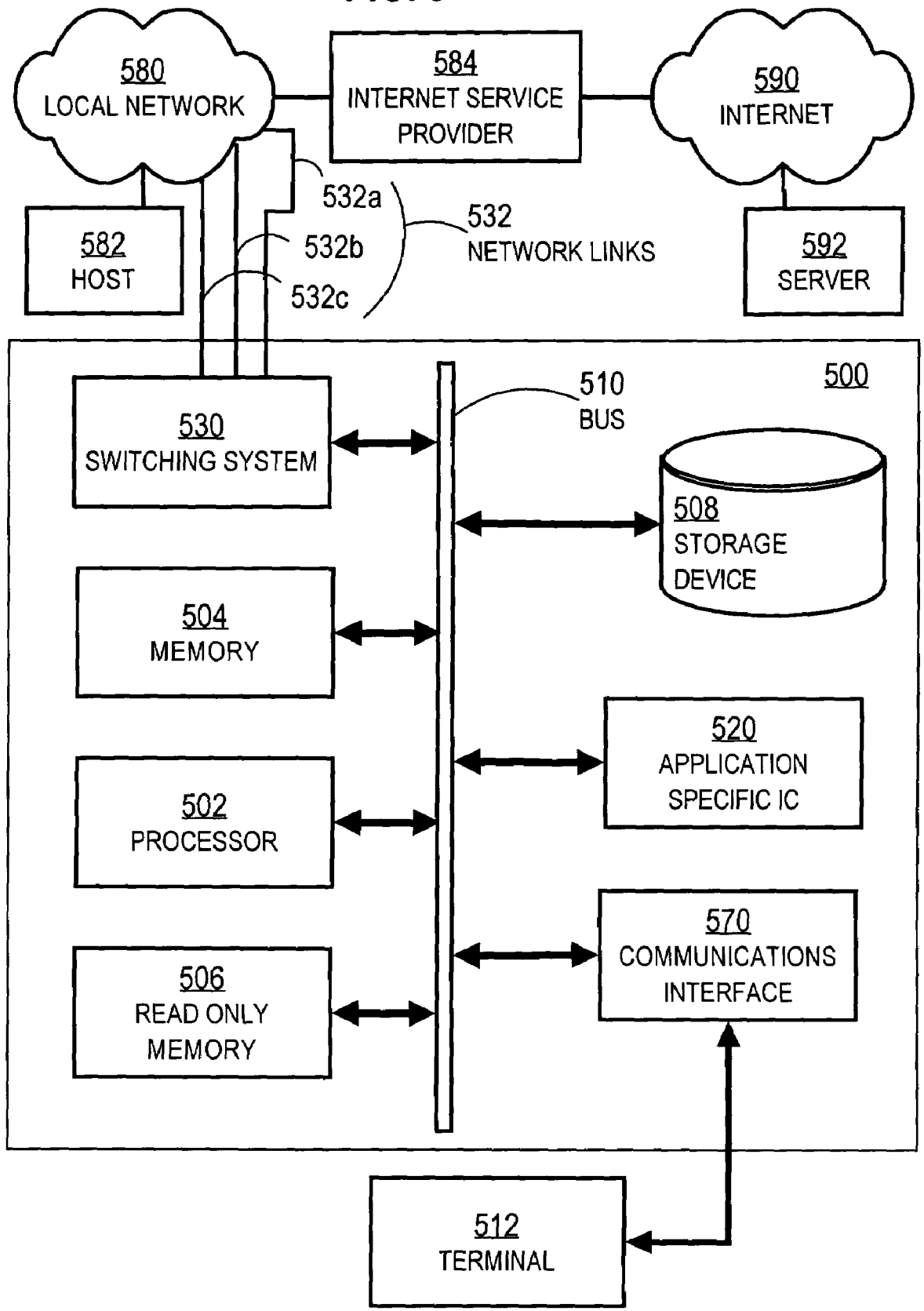
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for sharing routing information on a network with mobile routers, comprising the steps of:

receiving at a local router all routing information at a certain level of detail for all routers communicating in a current flooding domain, determining a measure of scale of a flooding domain that includes the current flooding domain;

determining whether the measure of scale exceeds a threshold; and if it is determined that the measure of scale exceeds the threshold, then performing the steps of:

sending, over a particular link of the plurality of links, a router announcement message that indicates the local router is a flooding domain border router (FDBR);

determining first summary routing information with less than the certain level of detail for a first plurality of routers connected to the local router through a set of one or more links of the local router different from the particular link; and sending the first summary routing information over the particular link in a link state message that includes type data that indicates summary routing information that crosses a FDBR.

2. A method as recited in claim 1, further comprising, if it is determined that the measure of scale exceeds the threshold, then performing the steps of:

determining a portion of the measure of scale associated with a link of a plurality of links on the local router;

determining whether to divide the flooding domain at the particular link based on the portion of the measure of scale associated with the particular link; and if it is determined to divide the flooding domain at the particular link, then performing said steps of sending the router announcement, determining the first summary information and sending the first summary information over the particular link.

3. A method as recited in claim 1, further comprising, if it is determined that the measure of scale exceeds the threshold, then performing the steps of:

determining second summary routing information with less than the certain level of detail for a second plurality of routers connected to the local router through the particular link; and sending the second summary routing information through the set of one or more links of the local router different from the particular link in a link state message that includes type data that indicates summary routing information that crosses a FDBR.

4. A method as recited in claim 1, wherein:

the flooding domain is at lest a portion of one Open Shortest Path First (OSPF) flooding area that uses an inter-area link state message from summary routing information that crosses an area boundary router (ABR) between different areas;

said step of sending the first summary routing information over the particular link in a link state message further comprising formatting the first summary information in accordance with an inter-area link state message that includes standard type data that indicates routing information that crosses an ABR; and the type data that indicates summary data that crosses a FDBR is different from the standard type data that indicates routing information that crosses an ABR.

5. A method as recited in claim 4, wherein the first summary routing information that crosses a FDBR is at a same level of detail as summary routing information that crosses an ABR.

6. A method as recited in claim 1, said step of determining a measure of scale of the flooding domain further comprising the steps of:

receiving, over a link with a new router, an adjacency invitation message that includes data that indicates a measure of scale for a new flooding domain that includes the new router; and determining a measure of scale of the current flooding domain combined with the new flooding domain.

7. A method as recited in claim 6, said step of determining a measure of scale of the flooding domain further comprising sending over the link with a new router, an adjacency invitation message that includes data that indicates a measure of scale for the current flooding domain.

8. A method as recited in claim 6, further comprising, if it is determined that the measure of scale does not exceed the threshold then performing the steps of:

determining whether the measure of scale is within a particular difference from the threshold; and if it is determined that the measure of scale is within a particular difference from the threshold, then performing the steps of waiting for a period of time after receiving the adjacency invitation message, and returning to said step of determining whether the measure of scale exceeds the threshold, wherein the period of time is sufficient for a different router to be added to the flooding zone.

9. A method as recited in claim 2, wherein:

said step of determining a measure of scale of the flooding domain further comprising the steps of receiving, over a link with a new router, an adjacency invitation message that includes data that indicates a measure of scale for a new flooding domain that includes the new router, and determining a measure of scale of the current flooding domain combined with the new flooding domain; and said step of determining whether to divide the flooding domain at a particular link further comprising the steps of determining whether the local router or the new router is to become a flooding domain boundary router (FDBR), and if it is determined that the new router is to become a FDBR, then determining not to divide the flooding domain at a particular link.

10. A method as recited in claim 9, said step of determining whether the local router or the new router is to become the FDBR further comprising the step of determining whether the local router or the new router is to become the FDBR based on a first router identifier (ID) for the local router and a second router ID for the new router.

11. A method as recited in claim 6, said step of determining a measure of scale of the flooding domain further comprising the steps of:

determining a whether the adjacency invitation message includes data that indicates the new router supports dividing a flooding domain at a FDBR; and if it is determined that the adjacency invitation message does not includes data that indicates the new router supports dividing a flooding domain at a FDBR, then including the new router and the new flooding domain into the current flooding domain and skipping said step of determining whether the measure of scale exceeds the threshold.

12. A method as recited in claim 1, said step of determining the measure of scale of the flooding domain further comprising determining a number of routers in the flooding domain.

13. A method as recited in claim 1, said step of determining the measure of scale of the flooding domain further comprising determining a network radius for the routers in the flooding domain.

14. A method as recited in claim 1, said step of sending over the particular link a router announcement message that indicates the local router is a FDBR, further comprising sending over the particular link a router announcement message that includes in an options field an FD bit that holds a value that indicates true.

15. A method as recited in claim 2, further comprising the steps of:
  determining whether to add the particular link into the flooding domain after said step of determining to divide the flooding domain at the particular link:, and
  if it is determined to add the particular link, then performing the steps of
    sending over the particular link a router announcement message that indicates the local router is not a FDBR, and
    sending over the link all routing information at the certain level of detail for all routers currently in the flooding domain.

16. An apparatus for sharing routing information on a network with mobile routers, comprising:
  means for receiving at a local router all routing information at a certain level of detail for all routers communicating in a current flooding domain;
  means for determining a measure of scale of a flooding domain that includes the current flooding domain;
  means for determining whether the measure of scale exceeds a threshold; and
  means for dividing the flooding domain if it is determined that the measure of scale exceeds the threshold, said means further comprising,
    means for sending, over a particular link of the plurality of links, a router announcement message that indicates the local router is a flooding domain border router (FDBR),
    means for determining first summary routing information with less than the certain level of detail for a first plurality of routers connected to the local router through a set of one or more links of the local router different from the particular link, and
    means for sending the first summary routing information over the particular link in a link state message that includes type data that indicates summary routing information that crosses a FDBR.

17. An apparatus for detecting loops in routes that cross route information boundaries in a packet-switched communications network, comprising:
  a first network interface that is in communication with a packet-switched network for communicating therewith a data packet;
  a second network interface that is in communication with a packet-switched network for communicating therewith a data packet;
  one or more processors that can access one or more sequences of instructions when executed by the one or more processors, causes the one or more processors to carry out the steps of:
    receiving through the first network interface all routing information at a certain level of detail for all routers communicating in a current flooding domain;
    determining a measure of scale of a flooding domain that includes the current flooding domain;
    determining whether the measure of scale exceeds a threshold; and
    if it is determined that the measure of scale exceeds the threshold, then performing the steps of
      sending over a particular network interface a router announcement message that indicates the apparatus is a flooding domain border router (FDBR),
      determining first summary routing information with less than the certain level of detail for a first plurality of routers connected through a network interface different from the particular network interface, and
      sending the first summary routing information over the particular network interface in a link state message that includes type data that indicates summary routing information that crosses a FDBR.

18. An apparatus as recited in claim 17, wherein execution of the one or more sequences of instructions further causes the one or more processors, if it is determined that the measure of scale exceeds the threshold, then to carry out the steps of:
  determining a portion of the measure of scale associated with a link of a plurality of links on the local router;
  determining whether to divide the flooding domain at the particular link based on the portion of the measure of scale associated with the particular link; and
  if it is determined to divide the flooding domain at the particular link, then performing said steps of sending the router announcement, determining the first summary information and sending the first summary information over the particular link.

19. An apparatus as recited in claim 17, wherein execution of the one or more sequences of instructions further causes the one or more processors, if it is determined that the measure of scale exceeds the threshoid, then to carry out the steps of:
  determining second summary routing information with less than the certain level of detail for a second plurality of routers connected to the local router through the particular link; and
  sending the second summary routing information through the set of one or more links of the local router different from the particular link in a link state message that includes type data that indicates summary routing information that crosses a FDBR.

20. An apparatus as recited in claim 17, wherein:
  the flooding domain is at least a portion of one Open Shortest Path First (OSPF) flooding area that uses an inter-area link state message for summary routing information that crosses an area boundary router (ABR) between different areas;
  said step of sending the first summary routing information over the particular link in a link state message further comprising formatting the first summary information in accordance with an inter-area link state message that includes standard type data that indicates routing information that crosses an ABR; and
  the type data that indicates summary data that crosses a FDBR is different from the standard type data that indicates routing information that crosses an ABR.

21. An apparatus as recited in claim 20, wherein the first summary routing information that crosses a FDBR is at a same level of detail as summary routing information that crosses an ABR.

22. An apparatus as recited in claim 17, said step of determining a measure of scale of the flooding domain further comprising the steps of:
  receiving, over the second network interface from a new router, an adjacency invitation message that includes data that indicates a measure of scale for a new flooding domain that includes the new router; and
  determining a measure of scale of the current flooding domain combined with the new flooding domain.

23. An apparatus as recited in claim 22, said step of determining a measure of scale of the flooding domain further comprising sending over the second network interface, an adjacency invitation message that includes data that indicates a measure of scale for the current flooding domain.

24. An apparatus as recited in claim 22, wherein execution of the one or more sequences of instructions further causes the one or more processors to, if it is determined that the measure of scale does not exceed the threshold, carry out the steps of:
  determining whether the measure of scale is within a particular difference from the threshold; and
  if it is determined that the measure of scale is within a particular difference from the threshold, then performing the steps of
    waiting for a period of time after receiving the adjacency invitation message, and
    returning to said step of determining whether the measure of scale exceeds the threshold,
  wherein the period of time is sufficient for a different router to be added to the flooding zone.

25. An apparatus as recited in claim 22, wherein:
  said step of determining a measure of scale of the flooding domain further comprising the steps of
    receiving, over a link with a new router, an adjacency invitation message that includes data that indicates a measure of scale for a new flooding domain that includes the new router, and
    determining a measure of scale of the current flooding domain combined with the new flooding domain; and
  said step of determining whether to divide the flooding domain at a particular link further comprising the steps of:
    determining whether the apparatus or the new router is to become a flooding domain boundary router (FDBR), and
    if it is determined that the new router is to become a FDBR, then determining not to divide the flooding domain at a particular link.

26. An apparatus as recited in claim 25, said step of determining whether the apparatus or the new router is to become the FDBR further comprising the step of determining whether the apparatus or the new router is to become the FDBR based on a first router identifier (ID) for the apparatus and a second router ID for the new router.

27. An apparatus as recited in claim 22, said step of determining a measure of scale of the flooding domain further comprising the steps of:
  determining whether the adjacency invitation message includes data that indicates the new router supports dividing a flooding domain at a FDBR; and
  if it is determined that the adjacency invitation message does not includes data that indicates the new router supports dividing a flooding domain at a FDBR, then including the new router and the new flooding domain into the current flooding domain and skipping said step of determining whether the measure of scale exceeds the threshold.

28. An apparatus as recited in claim 17, said step of determining the measure of scale of the flooding domain further comprising determining a number of routers in the flooding domain.

29. An apparatus as recited in claim 17, said step of determining the measure of scale of the flooding domain further comprising determining a network radius for the routers in the flooding domain.

30. An apparatus as recited in claim 17, said step of sending over the particular network interface a router announcement message that indicates the local router is a FDBR, further comprising sending over the particular network interface a router announcement message that includes in an options field an FD bit that holds a value that indicates true.

31. An apparatus as recited in claim 18, wherein execution of the one or more sequences of instructions further causes the one or more processors to the steps of:
  determining whether to add the particular network interface into the flooding domain after said step of determining to divide the flooding domain at the particular network interface; and
  if it is determined to add the particular link then performing the steps of
    sending over the particular network interface a router announcement message that indicates the local router is not a FDBR, and
    sending over the particular network interface all routing information at the certain level of detail for all routers currently in the flooding domain.

\* \* \* \* \*

UNITED STATES PATENT AND TRADEMARK OFFICE
CERTIFICATE OF CORRECTION

PATENT NO. : 7,609,672 B2  Page 1 of 1
APPLICATION NO. : 11/513099
DATED : October 27, 2009
INVENTOR(S) : Retana et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Twelfth Day of October, 2010

David J. Kappos
*Director of the United States Patent and Trademark Office*